May 3, 1938.  G. L. McCAIN  2,115,915
WHEEL SUSPENSION
Filed Dec. 9, 1933   2 Sheets-Sheet 1
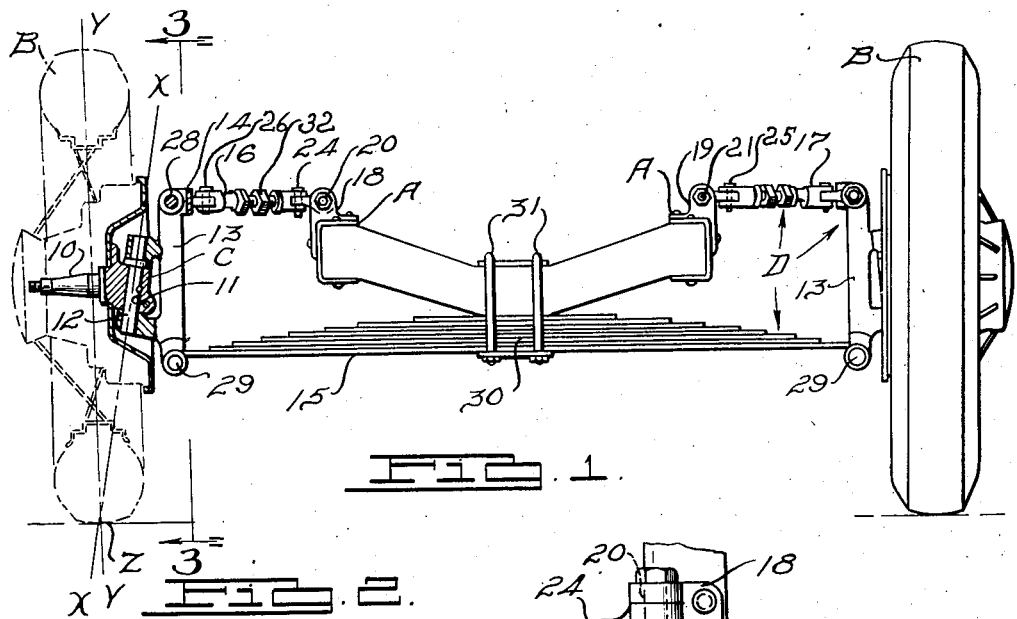
FIG. 1.
FIG. 2.
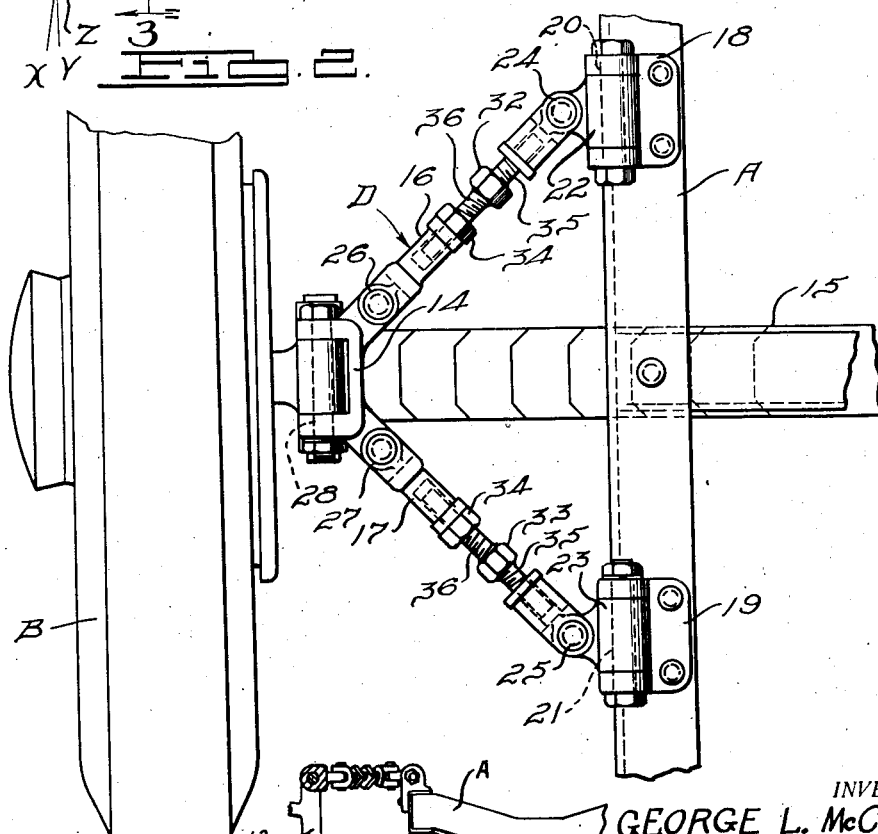
FIG. 1A.
INVENTOR.
GEORGE L. McCAIN.
BY
ATTORNEYS

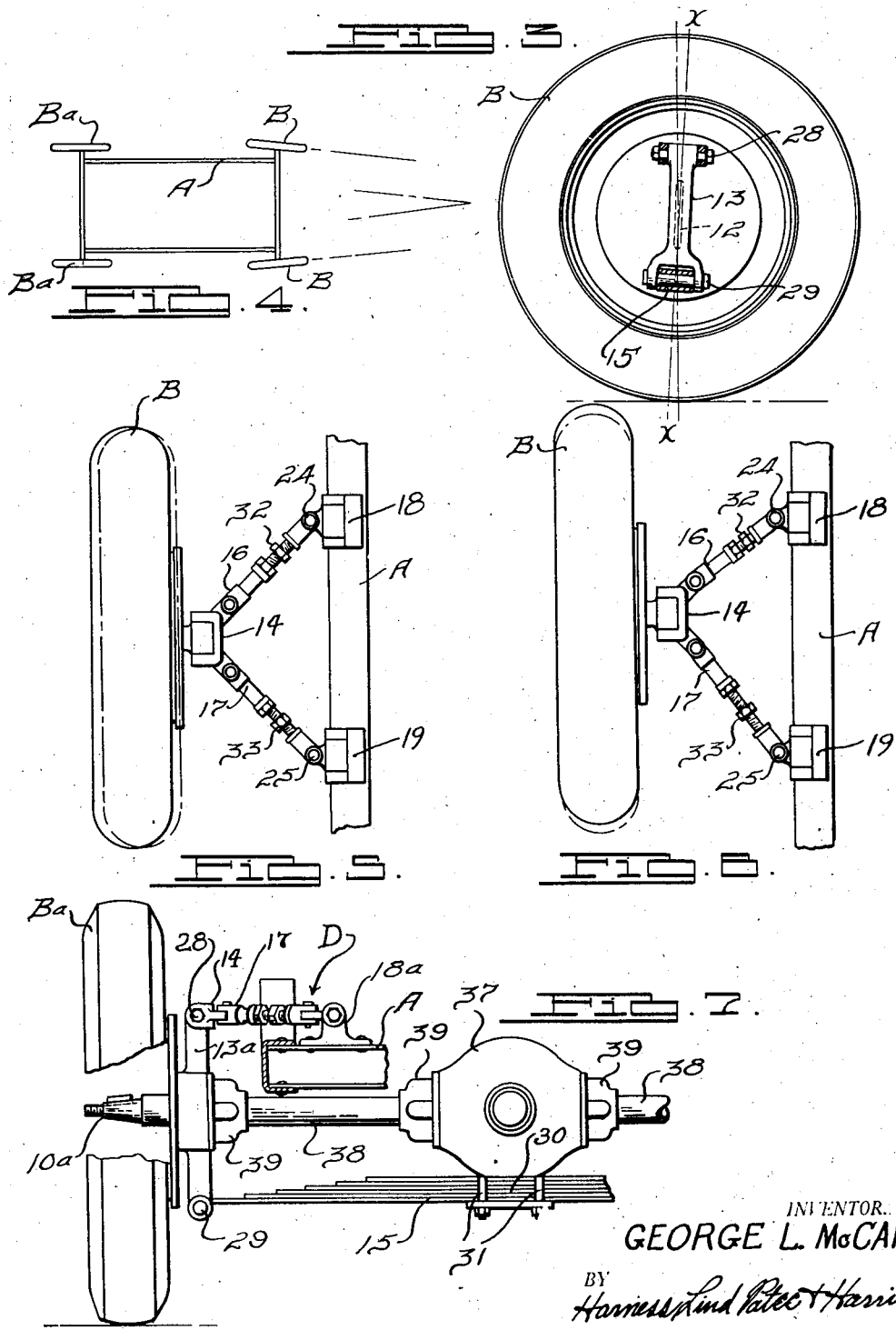

Patented May 3, 1938

2,115,915

UNITED STATES PATENT OFFICE 2,115,915

WHEEL SUSPENSION

George L. McCain, Detroit, Mich., assignor to Chrysler Corporation, Highland Park, Mich., a corporation of Delaware Application December 9, 1933, Serial No. 701,672

9 Claims. (Cl. 280—96.2)

This invention relates to wheel suspensions for vehicles and refers more particularly to so-called independent wheel suspensions for motor vehicles.

In suspensions of the type mentioned above, it is important to provide a predetermined desired wheel alignment, and in connection with the steering wheels it is particularly desirable to maintain accuracy in the mounting of such wheels to provide the desired degree of camber, toe-in, and caster. Failure to maintain the aforesaid characteristics may, and often does, result in excessive tire wear, difficult steering, shimmy or tramp of the steering wheels, and other undesirable effects.

In actual production, difficulty has been experienced in maintaining the aforesaid characteristics in keeping with practical limitations of cost, workmanship, manufacturing tolerances, and the like.

It is an object of my invention to overcome the aforesaid undesirable effects and difficulties.

A further object of my invention resides in the provision of an improved wheel suspension particularly adapted for manufacture at relatively low cost.

A still further object of my invention resides in the provision of an improved wheel suspension capable of manufacture in keeping with ordinary practical limitations of manufacturing tolerances.

In carrying out the objects of my invention, I preferably provide suitable means in the wheel suspension mechanism for conveniently and accurately compensating for any inaccuracies introduced in the manufacture and assembly of the parts thereof. Thus, by reason of my novel compensating means, any inaccuracies in wheel alignment, camber, caster, or toe-in may be readily corrected.

Further objects and advantages of my invention will be apparent from the following detailed description of my invention, reference being had to the accompanying drawings, in which I have shown several forms which my invention may assume by way of example and illustration.

In the drawings, in which like reference characters represent corresponding parts throughout the several views, Fig. 1 is a front elevational view of the forward vehicle steering wheels showing my improved suspension mechanism therefor.

Fig. 1ᵃ is a detail elevational view of a modified form of lower connector.

Fig. 2 is an enlarged plan view showing the suspension mechanism for one of the wheels of Fig. 1.

Fig. 3 is a side elevational view, partly in section, taken along the line III—III of Fig. 1.

Fig. 4 is a diagrammatic plan view of the vehicle wheels, illustrating the toe-in characteristic of the front wheels.

Fig. 5 is a detail plan view of one of the steering wheels illustrating the manner of adjusting the camber thereof.

Fig. 6 is a like view illustrating the manner of adjusting the king pin inclination as in the case of an adjustment in the caster angle.

Fig. 7 is a fragmentary view of the rear of the motor vehicle, illustrating my invention embodied in combination with a rear driving wheel.

In the drawings, reference character A represents the frame or load carrying structure of the motor vehicle, the body, engine and driving parts of the motor vehicle being largely omitted for clarity in my disclosure since such parts are well known in the art and may be of any desired form and arrangement.

In Figs. 1 to 6 I have illustrated my invention in connection with the forward steering ground wheels B of the motor vehicle, each wheel being journaled on a spindle 10 of the wheel supporting means C. This wheel supporting means of each of the wheels B is also preferably formed with a bearing 11 for receiving a king pin 12 providing swivelling of the steering wheel about the axis $x-x$ of the king pin or steering knuckle pivot.

As the parts associated with each of the wheels B are similar, the description, for the most part, will be limited to one of the wheels and parts associated therewith.

The wheels B, in their normal positions, illustrated in Fig. 1, are preferably cambered so that the plane Y—Y of each wheel extends upwardly and outwardly at an inclination to the vertical. The desirability of camber for steering wheels is generally accepted and understood and when axis $x-x$ lies along the intersection of plane Y—Y with the ground, then the traction resistance of the wheel has no effective lever arm. It is generally desirable to arrange the king pin so that its axis $x-x$ intersects the ground a small distance inside plane Y—Y, as represented by the point Z in Fig. 1, and such arrangement may be readily provided, if desired, in order to provide a lever arm tending to restore the wheel to its straight ahead position. In Fig. 1, I have shown the axis $x-x$ intersecting the plane Y—Y where this plane intersects the ground.

In addition to the aforesaid camber or pitch of the front wheels B, these wheels may also be slightly "toed-in" so that their aforesaid planes Y—Y, if projected forwardly for a considerable distance, would intersect. Toe-in is a characteristic of steering wheel geometry which is generally regarded as desirable in that, among other things, it serves to offset a tendency of the steering wheels to diverge, when in operation, under the influence of the camber characteristic. In Fig. 4 I have diagrammatically illustrated the forwardly converging toe-in effect of the front wheels B, this being exaggerated for illustration.

By referring to Fig. 3, it will be noted that the king pin 12, when viewed from the side of the vehicle, has an inclination from the vertical upwardly and to the rear, commonly referred to as the caster characteristic. This caster effect facilitates steering of the wheels B and is otherwise generally desirable in imparting a trailing effect to the front wheels. From Fig. 3 it will be noted that the axis $x$—$x$ intersects the ground in front of the theoretical point of vertical contact of the wheel tire with the ground.

In order to support the frame structure A by the wheels B and to provide substantially independent suspension or springing movement of each of the wheels B relative to each other, I have provided the connecting means D intermediate the frame and the wheel supporting means C. This connecting means includes an arm or yoke 13 associated with each of the wheels B, each arm being adapted to support or carry a king pin 12 by reason of the spaced yoke portions thereof.

Arm 13 extends generally vertically in the sense that the ends thereof are positioned in spaced relation, the connecting means D, in the illustrated embodiments of my invention being arranged in a substantially trapezoidal shape. Thus, during a displacement of the wheel, the track between wheels B remains practically unchanged when either wheel strikes a depression or encounters a bump in the roadway. The linkage or connecting means D, while of the general parallelogram type, is preferably arranged in the form of a rectangle and more particularly in the form of a trapezoid defined by various supports for the linkage parts.

Extending generally laterally or transversely of the vehicle, are the upper and lower linkages or connectors 14 and 15, respectively. Where the aforesaid trapezoidal arrangement of linkage is desired, connector 15 is somewhat longer than connector 14, as illustrated, this arrangement deviating somewhat from a true parallelogram so as to provide substantially vertically guided movement of the point of wheel tread contact with the ground, on displacement of the wheel. Connector 14 is shown having substantially a wishbone or V-shape, the arms 16 and 17 thereof diverging toward frame A for pivotal connection therewith. With this in view, frame A carries spaced brackets 18 and 19 respectively, carrying pivot pins 20 and 21, which in turn support swivel members 22 and 23. These swivel members have pivot pins 24 and 25 located at right angles with their respectively associated pins 20 and 21. Pivot pin 24 receives the inner end of arm 16 and pin 25 likewise receives the inner end of the companion arm 17. By reason of the swivel members 22 and 23, together with the pivot pins 20 and 21 associated therewith, wheel B may have a yieldingly displacing movement upwardly and downwardly about these horizontally disposed pivot pins, the lower ends of links 13 being guided by the lower connector 15.

The pins 24 and 25 permit adjustment of links 16 and 17, these pins being supplemented, if desired, by a second set of pins 26 and 27 pivotally connecting the outer portions of the links with that portion of the connector 14 which is pivoted to the upper end of arm 13 by reason of the pivot pin 28. The purpose of the adjustment will be hereinafter more apparent.

Connector 15 is illustrated in Fig. 1 in the form of a leaf spring assembly. While this assembly may extend as a unit between the lower ends of arms 13 for pivotal connection therewith at 29, I desire to point out that this spring assembly is, in effect, a plurality of connectors, each extending from a suitable point of support. In the illustrated embodiment of my invention, this support is provided by the central region 30 of the spring assembly 15 from which region these connectors extend laterally for connection with the respective arms 13. This region 30 is fixed to the frame structure A by means of suitable U-bolts 31. In this manner, opposite ends of connector 15 are independent of each other in response to movement occasioned by the wheels associated therewith.

From the foregoing reference to the various desirable characteristics of wheel geometry, it follows that, prior to the teachings of my invention, it would be necessary to maintain, at undesirably high cost, an unusually high degree of machining tolerances, and skill in assembly and general workmanship, if some or all of these desirable characteristics are to be obtained with the desired degree of precision in the production of motor vehicles. These objectionable factors are most pronounced in the so-called independently sprung wheels to which class my invention particularly relates. Where connector 15 is in the form of a spring assembly, difficulty has been experienced in maintaining the spring length to the desired accurate length. My invention will compensate for such inaccuracies, as well as for inaccuracies in other parts of the linkage forming a wheel suspension mechanism.

In overcoming the aforesaid difficulties and expense, I have provided means for adjusting the normal position of any ground wheel whereby to conveniently and accurately compensate for errors introduced during the manufacturing and assembly processes as well as during the life of the motor vehicle from a service adjustment standpoint.

My adjusting means may consist in forming arms 16 and 17 of connector 14 in sections connected by adjusting devices illustrated as turnbuckles 32 and 33. Each turnbuckle may have a lock nut 34 or other suitable locking means associated with one or both of the oppositely threaded ends 35 and 36 engaging the arm sections.

In operation of the adjusting means, when it is desired to vary the camber of one of the wheels B, for example, the turnbuckles 32 and 33 of the connector 14 associated therewith, are rotated the desired degree to cause separating movement of the sections of arms 16 and 17, lock nut 34 serving to hold the parts secure after adjustment is effected. In Fig. 5 I have shown in solid lines the wheel adjustment for camber, the position of the wheel before adjusting being shown in dotted lines. During this adjustment, arm 13 has been slightly swung about the lower pivot. In Fig. 5 the elongation of arms 16 and 17 is permitted by means of the pivot pins associated therewith. In this instance, a greater camber or inclination of the plane Y—Y has resulted from this adjustment.

When it is desired to vary or adjust the caster angle of the king pin 12, one of the turnbuckles may be actuated relative to the other, one more than the other, or one in one direction and the other in the other direction, as will be readily understood. Referring to Fig. 6, I have shown the turnbuckle 33 actuated to lengthen the arm 17 whereby to swing arm 13 on its lower pivot slightly rearwardly. Such movement likewise carries the king pin 12 with arm 13 and thereby varies the caster angle thereof. After turnbuckle 33 has been actuated to lengthen link 17, the turnbuckle 32 may be actuated to a lesser extent to shorten link 16 so as to prevent any tendency to unduly alter the toe-in characteristics of the wheel.

By adjusting the turnbuckles it is therefore possible, with my construction, to impart either a lateral swinging adjustment to the king pin and wheel, a longitudinal swinging adjustment forwardly or rearwardly, or a combination of these movements to readily compensate for the aforesaid inaccuracies and to adjust the wheel to provide efficient operation in keeping with the aforementioned desirable characteristics of wheel geometry. In making adjustments wherein arm 13 is slightly moved forwardly or rearwardly, it will be understood that the lower connector 15 may be slightly sprung to accommodate such adjustment.

Where the lower connector of the wheel supporting linkage is not of an inherently yielding character, it may take the form of a rigid link 15ª illustrated in Fig. 1ª, this link being pivoted at 30 to the frame and at 29 to the arm 13, just as in the Fig. 1 arrangement. In Fig. 1, the link 15ª is provided, either at one of its ends or at some point intermediate its ends, with suitable means for accommodating the aforesaid adjustment of the upper linkage and wheel. Thus, link 15ª may have a swivel joint 15ᵇ intermediate its length. It will be understood that the Fig. 1 arrangement apart from link 15ª being substituted for linkage 15 of Fig. 1, does not differ from the Fig. 1 arrangement in construction and operation. For simplicity of disclosure the similar parts have not been duplicated.

In Fig. 7 I have illustrated my invention in connection with a wheel Bª having associated therewith the arm 13ª which, in this instance, is formed with the driving spindle 18ª without the interposition of a king pin. This general form of suspension is particularly adapted for the rear or non-steering wheels of the vehicle. Apart from the omission of the king pin, the supporting means D, including adjustable link arms 16 and 17 and lower linkage or connector 15, may be arranged substantially as described and illustrated in connection with the front or steering wheels B. The adjustment for wheels Bª is primarily for alignment and track width, although a small amount of camber may be also provided.

In Fig. 7, the inner ends of the links 16 and 17 are supported by brackets 18a above the frame A, the latter being somewhat wider at the rear of the vehicle.

In Fig. 7, the drive is partially shown and may include the differential housing 37, together with wheel driving shafts 38. Suitable universal joints 39 permit the wheels Bª to relatively move in substantially the same manner as in the case of the front wheels B.

I have not shown or described the steering or braking mechanism for the wheels, as such devices are well known in the art and form no part per se of this invention.

I desire to point out that various modifications and changes will be apparent from the teachings of my invention and I do not limit my invention in its broader aspects to the particular combination and arrangement of parts which I have shown by way of example.

What I claim is:

1. In a wheel suspension for a motor vehicle having a frame structure, a wheel supporting structure, means connecting the wheel supporting structure with the frame structure and adapted to guide displacement of the wheel relative to the frame structure, said connecting means including a link, said link having a pair of arms diverging toward said frame and pivotally connected therewith, and means for relatively varying the length of said arms.

2. In a wheel suspension for a motor vehicle having a frame structure, a wheel supporting structure, means connecting the wheel supporting structure with the frame structure and adapted to guide displacement of the wheel relative to the frame structure, said connecting means including a link, said link having a pair of arms diverging toward said frame and pivotally connected therewith, and means for selectively adjusting the length of said arms.

3. In a wheel suspension for a motor vehicle having a frame structure, a wheel supporting structure, means connecting the wheel supporting structure with the frame structure and adapted to guide displacement of the wheel relative to the frame structure, said means including a wishbone member, and means associated with one of the arms of said wishbone member intermediate the length thereof for adjusting the length thereof.

4. In a wheel suspension for a motor vehicle having a frame structure, a wheel supporting structure, means connecting the wheel supporting structure with the frame structure and adapted to guide displacement of the wheel relative to the frame structure, said means including a lower transversely extending leaf spring assembly and an upper transversely extending substantially V-shaped member, and means intermediate the ends of the respective arms of said V-shaped member for varying the lengths of said arms respectively whereby to compensate for inaccuracies in the production and assembly of said connecting means.

5. In a wheel suspension of the substantially independently sprung type, wheel supporting means, means including an arm associated with said supporting means and connected thereto to provide swivelling of the wheel and wheel supporting means relative to said arm, a substantially V-shaped linkage connecting said arm with the vehicle frame, and means for varying the lengths of the arms of said V-shaped linkage to vary the location of the connection between said first arm and said V-shaped linkage longitudinally and transversely with respect to said frame.

6. In a motor vehicle wheel suspension, means connecting said wheel with the vehicle load carrying structure, said connecting means being adapted to support said structure from said wheel and to provide displacement of said wheel relative to said structure substantially independently of the other wheels of the vehicle, said connecting means including a link member extending at an angle generally laterally and longitudinally of the vehicle from said structure, and means included in the link for changing the length thereof for varying the normal position of said wheel relative to said structure.

7. In a motor vehicle wheel suspension having a vehicle frame structure, upper and lower linkages having their inner ends connected to the frame structure, means pivotally connected to the outer ends of said linkages for mounting a steerable ground wheel, said linkages and mounting means being so constructed and arranged as to guide rising and falling movements of said wheel independently of the other wheels of the vehicle, one of said linkages comprising a link member having a turnbuckle intermediate the length thereof for varying the normal position of said wheel relative to said frame structure.

8. In a motor vehicle wheel suspension having a vehicle frame structure, upper and lower linkages having their inner ends connected to the frame structure, means pivotally connected to the outer ends of said linkages for mounting a steerable ground wheel, said linkages and mounting means being so constructed and arranged as to guide rising and falling movements of said wheel independently of the other wheels of the vehicle, one of said linkages comprising a pair of outwardly converging link members each having a turnbuckle intermediate the length thereof for varying the normal position of said wheel relative to said frame structure.

9. In an independent suspension for a dirigible ground wheel of a motor vehicle having a frame structure, a wheel support having a king pin for accommodating steering movement of the wheel, a pair of elements connected together for relative adjustment therebetween, means for mounting one of said elements on said frame structure for swinging movement thereof about an axis extending substantially parallel with a vertical plane containing the longitudinal axis of the vehicle, and means connecting the other of said elements to said wheel support, whereby relative adjustment of said elements will simultaneously displace one end of said king pin in a path generally longitudinally and transversely of said plane.

GEORGE L. McCAIN.